United States Patent
Kano et al.

(10) Patent No.: US 11,936,069 B2
(45) Date of Patent: Mar. 19, 2024

(54) LAYERED DOUBLE HYDROXIDE AND METHOD FOR PRODUCTION THEREOF, AND AIR ELECTRODE AND METAL-AIR SECONDARY BATTERY THAT USE SAID LAYERED DOUBLE HYDROXIDE

(71) Applicant: NGK Insulators, Ltd., Nagoya (JP)

(72) Inventors: Ozora Kano, Nagoya (JP); Naomi Hashimoto, Nagoya (JP); Naomi Saito, Nagoya (JP); Yukari Sakurayama, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 56 days.

(21) Appl. No.: 17/812,236

(22) Filed: Jul. 13, 2022

(65) Prior Publication Data

US 2022/0363560 A1 Nov. 17, 2022

Related U.S. Application Data

(63) Continuation of application No. PCT/JP2021/001794, filed on Jan. 20, 2021.

(30) Foreign Application Priority Data

Mar. 2, 2020 (JP) .................................. 2020-034624

(51) Int. Cl.
*H01M 50/46* (2021.01)
*C01G 31/00* (2006.01)
(Continued)

(52) U.S. Cl.
CPC .......... *H01M 50/46* (2021.01); *C01G 31/006* (2013.01); *C01G 49/0018* (2013.01);
(Continued)

(58) Field of Classification Search
None
See application file for complete search history.

(56) References Cited

U.S. PATENT DOCUMENTS

| | | | |
|---|---|---|---|
| 2018/0034050 A1* | 2/2018 | Son | H01M 4/0471 |
| 2019/0131605 A1 | 5/2019 | Yamamoto et al. | |
| 2022/0052422 A1 | 2/2022 | Kano et al. | |

FOREIGN PATENT DOCUMENTS

| | | | |
|---|---|---|---|
| CN | 104192810 A | * | 12/2014 |
| CN | 108726582 A | | 11/2018 |

(Continued)

OTHER PUBLICATIONS

Yasuaki Tokudome, et al., "Layered Double Hydroxide Nanoclusters: Aqueous, Concentrated, Stable, and Catalytically Active Colloids Toward Green Chemistry," *ACS Nano*, 2016, No. 10, pp. 5550-5559 (10 pages).

(Continued)

*Primary Examiner* — Amanda C. Walke
(74) *Attorney, Agent, or Firm* — BURR PATENT LAW, PLLC

(57) ABSTRACT

A layered double hydroxide is represented by the following formula (I): $Ni^{2+}_{1-(x+y+z)}Fe^{3+}_{x}V^{3+}_{y}Co^{3+}_{z}(OH)_{2}A^{n-}_{(x+y+z)/n} \cdot mH_{2}O$ ... (I). In one embodiment, in the (Continued)

formula (I), (x+y+z) is from 0.2 to 0.5, "x" represents more than 0 and 0.3 or less, "y" represents from 0.04 to 0.49, and "z" represents more than 0 and 0.2 or less.

5 Claims, 7 Drawing Sheets

(51) Int. Cl.
*C01G 49/00* (2006.01)
*C01G 51/00* (2006.01)
*C01G 51/04* (2006.01)
*C01G 53/00* (2006.01)
*C01G 53/04* (2006.01)
*H01M 12/02* (2006.01)
*H01M 12/08* (2006.01)

(52) U.S. Cl.
CPC ......... *C01G 49/009* (2013.01); *C01G 51/006* (2013.01); *C01G 51/04* (2013.01); *C01G 53/006* (2013.01); *C01G 53/04* (2013.01); *H01M 12/02* (2013.01); *H01M 12/08* (2013.01); *C01P 2006/40* (2013.01)

(56) References Cited

FOREIGN PATENT DOCUMENTS

| | | | |
|---|---|---|---|
| CN | 110760879 A | | 2/2020 |
| CN | 111472020 A | | 7/2020 |
| CN | 116334649 A | * | 6/2023 |
| JP | 2015207515 A | * | 11/2015 |
| KR | 102419093 B1 | * | 7/2022 |
| WO | 2017/221497 A1 | | 12/2017 |
| WO | 2018/150898 A1 | | 8/2018 |
| WO | 2020/034007 A1 | | 2/2020 |
| WO | 2020/246177 A1 | | 12/2020 |

OTHER PUBLICATIONS

Chinese Office Action (Application No. 202180007714.3) dated Jul. 4, 2023 (8 pages).
International Search Report and Written Opinion (Application No. PCT/JP2021/001794) dated Apr. 27, 2021 (with English translation).
English Translation of International Preliminary Report on Patentability, International Application No. PCT/JP2021/001794, dated Sep. 6, 2022 (6 pages).

* cited by examiner

LAYERED DOUBLE HYDROXIDE AND METHOD FOR PRODUCTION THEREOF, AND AIR ELECTRODE AND METAL-AIR SECONDARY BATTERY THAT USE SAID LAYERED DOUBLE HYDROXIDE

CROSS-REFERENCE TO RELATED APPLICATION

This application is a continuation under 35 U.S.C. 120 of International Application PCT/JP2021/001794 having the International Filing Date of Jan. 20, 2021, and having the benefit of the earlier filing date of Japanese Application No. 2020-034624, filed on Mar. 2, 2020. Each of the identified applications is fully incorporated herein by reference.

BACKGROUND OF THE INVENTION

Technical Field

The present invention relates to a layered double hydroxide and a method of producing the same, and to an air electrode and a metal-air secondary battery each using the layered double hydroxide.

Background Art

As a candidate for an innovative battery, there is given a metal-air secondary battery. The metal-air secondary battery is a secondary battery using a metal as an active material in a negative electrode and oxygen and/or water in air as an active material in a positive electrode. In the positive electrode (air electrode) of the air secondary battery, the following electrochemical reactions occur: hydroxide ions are produced at the time of discharge (oxygen reduction reaction, hereinafter "ORR") and oxygen is evolved at the time of charge (oxygen evolution reaction, hereinafter "OER"). In order to promote the ORR/OER reactions, a catalyst having high activity is needed. As such catalyst for the air electrode, a layered double hydroxide (LDH) is drawing attention. The LDH refers to a group of substances each having an exchangeable anion layer between hydroxide layers, and has a function as an OER-side catalyst and also has a function of conducting hydroxide ions. In recent years, progress has been made in practical application of a binary LDH, such as a Ni—Fe-based LDH or a Ni—Co-based LDH, as an OER catalyst, but the LDH still has room for many improvements as a catalyst.

CITATION LIST

Patent Literature

[PTL 1] WO 2017/221497 A1

SUMMARY OF THE INVENTION

The present invention has been made in order to solve the problem of the related art described above, and a primary object of the present invention is to provide a layered double hydroxide having an excellent oxygen-evolving catalytic function.

According to one aspect of the present invention, there is provided a layered double hydroxide, which is represented by the following formula (I):

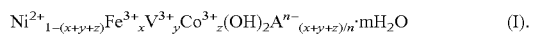

$$Ni^{2+}_{1-(x+y+z)}Fe^{3+}_{x}V^{3+}_{y}Co^{3+}_{z}(OH)_2 A^{n-}_{(x+y+z)/n} \cdot mH_2O \quad (I).$$

In one embodiment, in the formula (I), (x+y+z) is from 0.2 to 0.5, represents more than 0 and 0.3 or less, "y" represents from 0.04 to 0.49, and "z" represents more than 0 and 0.2 or less.

According to another aspect of the present invention, there is provided a method of producing the above-mentioned layered double hydroxide. The production method includes: dissolving salts of Ni, Fe, V, and Co in an aqueous medium at respective predetermined molar ratios to prepare a solution; adding acetylacetone during the preparation of the solution or after the preparation; adding propylene oxide to the solution having added thereto acetylacetone; leaving the solution having added thereto propylene oxide to stand for a predetermined period of time to form a gel containing a composite of Ni, Fe, V, and Co; and leaving the gel to stand for a predetermined period of time to deflocculate the gel, to thereby form a sol containing fine particles of the layered double hydroxide represented by the formula (I).

In one embodiment, the salts are chlorides.

According to still another aspect of the present invention, there is provided an air electrode. The air electrode includes: a porous current collector; and a catalyst layer formed of the above-mentioned layered double hydroxide, the catalyst layer covering at least part of the porous current collector.

According to yet still another aspect of the present invention, there is provided a metal-air secondary battery. The metal-air secondary battery includes: the above-mentioned air electrode; a hydroxide ion conductive dense separator; an electrolytic solution; and a metal negative electrode, wherein the electrolytic solution is separated from the air electrode by the hydroxide ion conductive dense separator.

ADVANTAGEOUS EFFECTS OF INVENTION

According to the embodiments of the present invention, the layered double hydroxide is designed to be a composite of the four elements of Ni, Fe, V, and Co, and thus can achieve an oxygen-evolving catalytic function that is remarkably excellent as compared to that of a related-art layered double hydroxide.

DETAILED DESCRIPTION OF THE INVENTION

Embodiments of the present invention are described below. However, the present invention is not limited to these embodiments.

A. Layered Double Hydroxide

A layered double hydroxide (LDH) according to an embodiment of the present invention is represented by the following formula (I):

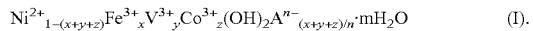

$$Ni^{2+}_{1-(x+y+z)}Fe^{3+}_xV^{3+}_yCo^{3+}_z(OH)_2A^{n-}_{(x+y+z)/n} \cdot mH_2O \quad (I).$$

That is, the LDH does not merely contain the four elements of Ni, Fe, V, and Co (for example, is not a mere mixture of respective salts of these four elements), but is a composite of these four elements (quaternary LDH). The LDH, by being designed to be a composite containing the four elements of Ni, Fe, V, and Co, can achieve an oxygen-evolving catalytic function that is remarkably excellent as compared to that of a related-art layered double hydroxide. This may be presumably because the increased number of constituent components increases the number of active sites and/or density, and besides, the large number of constituent components results in an increase in interaction between such active sites. Presumptions made herein about effects and mechanisms do not limit the present invention, and the present invention is not bound by such presumptions.

In the formula (I), (x+y+z) is preferably from 0.2 to 0.5, more preferably from 0.25 to 0.45, still more preferably from 0.3 to 0.4. "x" represents preferably more than 0 and 0.3 or less, more preferably from 0.005 to 0.25, still more preferably from 0.01 to 0.2. "y" represents preferably from 0.04 to 0.49, more preferably from 0.06 to 0.35, still more preferably from 0.07 to 0.3. "z" represents preferably more than 0 and 0.2 or less, more preferably from 0.005 to 0.18, still more preferably from 0.01 to 0.17. When "x", "y", and "z" (i.e., the composition ratios of Ni, Fe, V, and Co) fall within such ranges, a more excellent oxygen-evolving catalytic function can be achieved. More specifically, in the case of using the quaternary LDH as a catalyst for an air electrode of a metal-air secondary battery, its onset potential can be lowered, and/or a lower potential (lower resistance) than that of a related-art LDH (e.g., a binary LDH) can be achieved at the same current density. "x", "y", and "z" may each independently take a value in the above-mentioned preferred ranges as long as no mathematical contradiction arises.

Figure 1A:
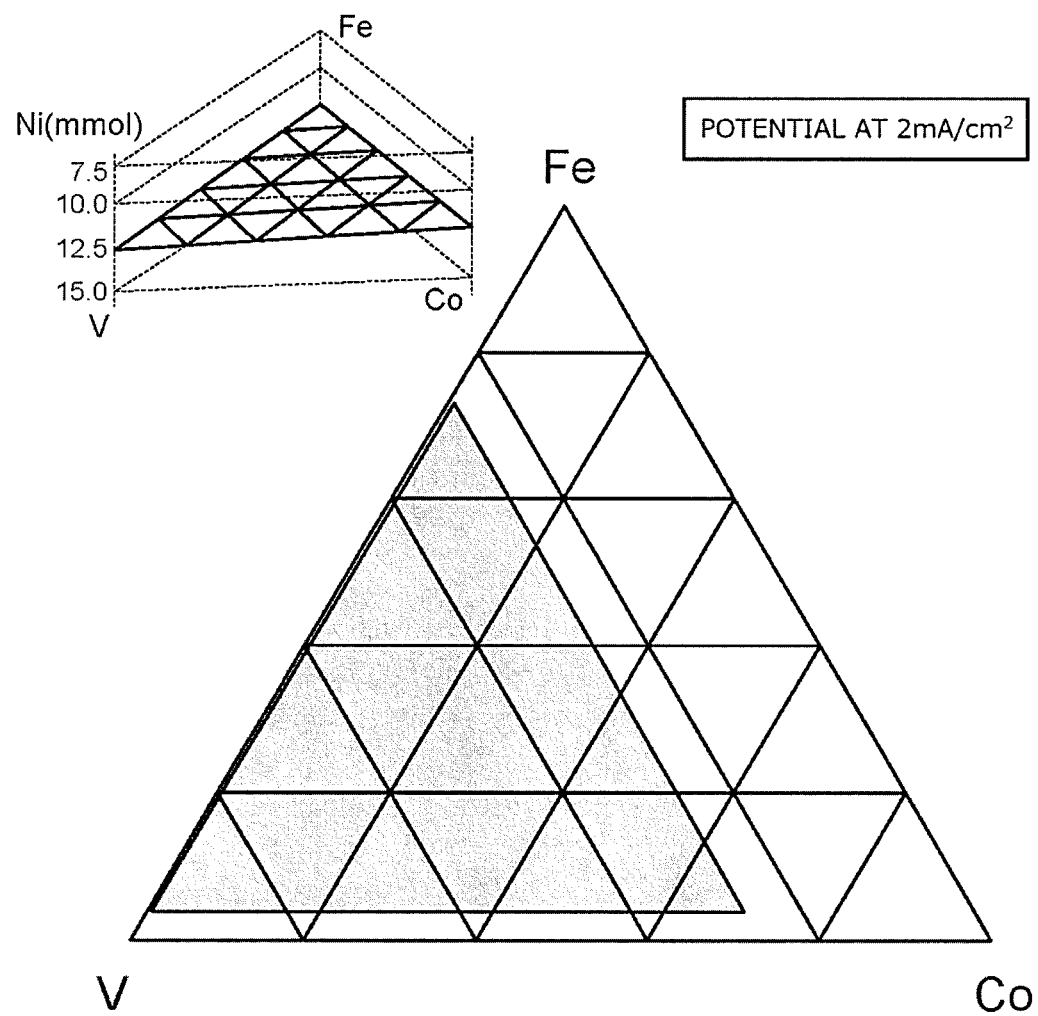
FIG. 1A is a composition diagram for illustrating such composition ratios of Fe, V, and Co that a particularly satisfactory potential is obtained at a predetermined current density when Ni is fixed at a predetermined composition ratio.
Figure 1B:
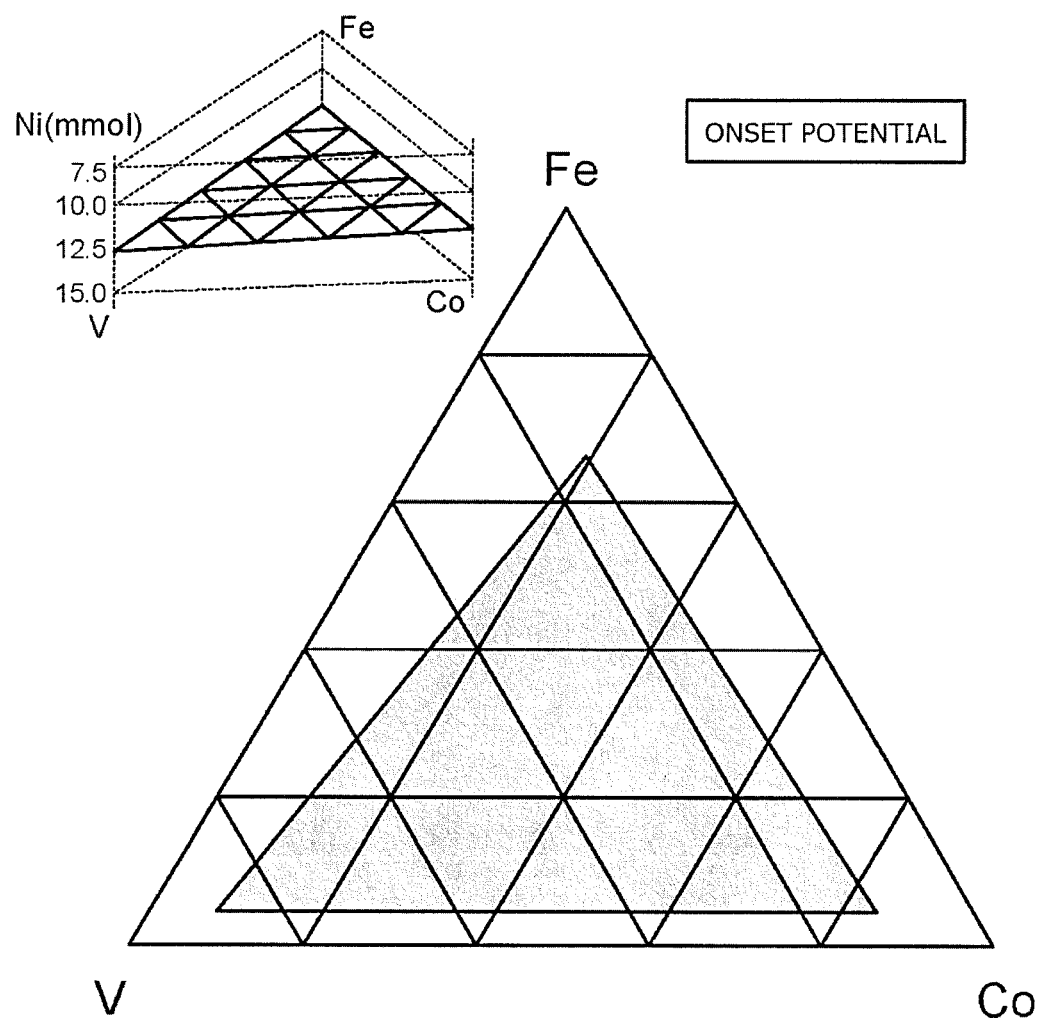
FIG. 1B is a composition diagram for illustrating such composition ratios of Fe, V, and Co that a particularly satisfactory onset potential is obtained when Ni is fixed at a predetermined composition ratio.
Figure 1C:
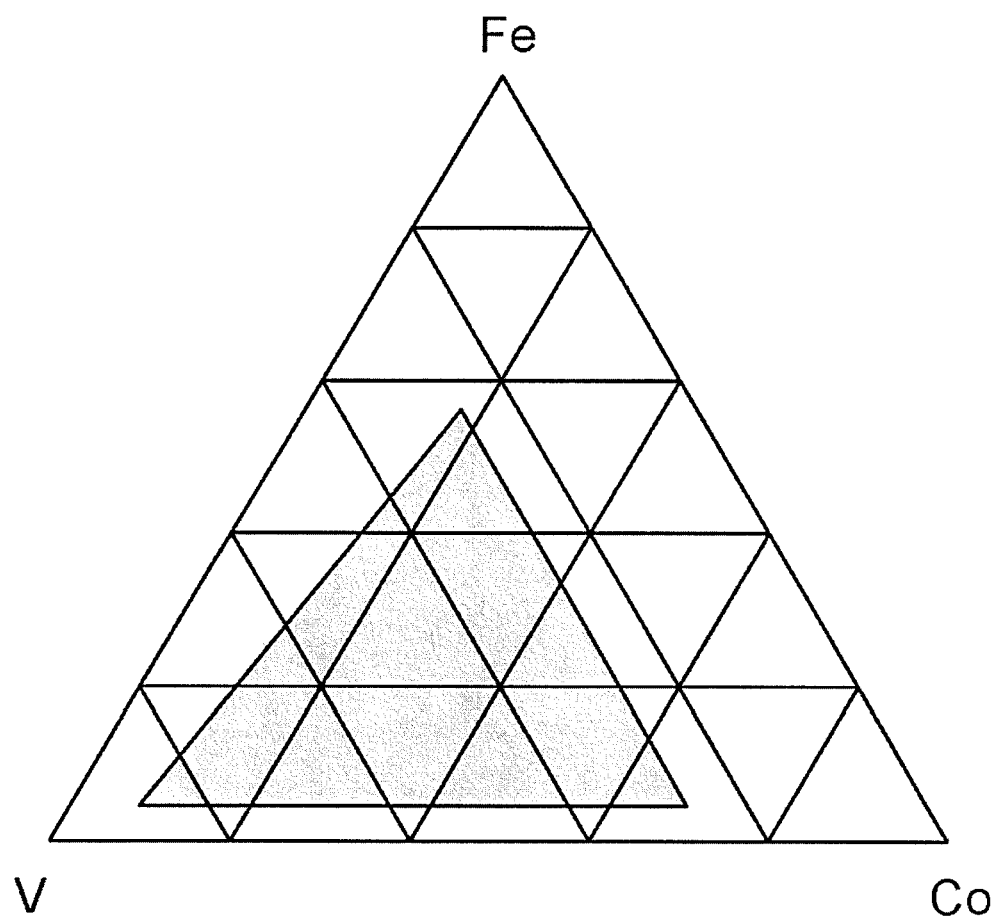
FIG. 1C is a composition diagram for illustrating such composition ratios of Fe, V, and Co that a particularly satisfactory potential and a particularly satisfactory onset potential are both obtained at a predetermined current density when Ni is fixed at a predetermined composition ratio.

"x", "y", and "z" (composition ratios of Ni, Fe, V, and Co) are described in more detail. FIG. 1A is a quaternary composition diagram for illustrating such composition ratios of Fe, V, and Co that a particularly satisfactory potential is obtained at a predetermined current density; FIG. 1B is a quaternary composition diagram for illustrating such composition ratios of Fe, V, and Co that a particularly satisfactory onset potential is obtained; and FIG. 1C is a quaternary composition diagram for illustrating such composition ratios of Fe, V, and Co that a particularly satisfactory potential and a particularly satisfactory onset potential are both obtained at a predetermined current density. As illustrated in the upper left of FIG. 1A and FIG. 1B, the triangular plane composition diagrams in FIG. 1A and FIG. 1B are composition diagrams of Fe, V, and Co in the case where Ni is set to 12.5 mmol. 12.5 mmol of Ni is adjusted so as to be from 60% to 70% with respect to the total of the four elements (that is, in the formula (I), "x+y+z" is from 0.3 to 0.4) by adjusting the use amounts (numbers of moles) of Fe, V, and Co. In FIG. 1A, the composition of Fe, V, and Co with which a particularly satisfactory potential is obtained in the case where the current density is 2 mA/cm$^2$ is shaded in the illustration. In FIG. 1B, the composition of Fe, V, and Co with which a particularly satisfactory onset potential is obtained is shaded in the illustration. In FIG. 1C, the composition of Fe, V, and Co with which a particularly satisfactory potential and a particularly satisfactory onset potential are both obtained in the case where the current density is 2 mA/cm$^2$ is illustrated as an overlap between the shaded parts of FIG. 1A and FIG. 1B. As understood from FIG. 1C, when Ni serving as a main component (majority amount), a relatively large amount of V, and relatively small amounts of Fe and Co are composited, a particularly satisfactory potential and a particularly satisfactory onset potential can both be achieved at the predetermined current density. This may be presumably because of a further increase in the above-mentioned interaction between the active sites caused by the incorporation of a relatively large amount of V, which can adopt valences widely ranging from 2 to 5.

In the formula (I), $A^{n-}$ represents any appropriate anion. Specific examples thereof include $NO_3^-$, $CO_3^{2-}$, $SO_4^{2-}$, $OH^-$, and $Cl^-$. Of those, $CO_3^{2-}$, $OH^-$, and $Cl^-$ are preferred. $A^{n-}$ may represent a single anion, or may represent a combination of a plurality of anions. "n" represents an integer of 1 or more, preferably from 1 to 3. "m" represents any appropriate real number, preferably a real number of more than 0, more preferably a real number or integer of 1 or more.

The LDH may be, for example, plate-like fine particles. The LDH may have any appropriate plan view shape. Specific examples thereof include a circular shape, an oval shape, a rectangular shape, a triangular shape, a polygonal shape, and an indefinite shape. The size of the LDH is, for example, from 1 nm to 2 μm, and the thickness thereof is, for example, from 0.5 nm to 50 nm. The "size of the LDH" refers to the size of the plan view shape of the LDH, and for example, refers to the diameter in the case of a circular shape, the long diameter in the case of an oval shape, and the length of a long side in the case of a rectangular shape.

B. Method of Producing Layered Double Hydroxide

In one embodiment, the LDH may be produced by a so-called sol-gel method. A method of producing the LDH by the sol-gel method typically includes: dissolving salts of Ni, Fe, V, and Co in an aqueous medium at respective predetermined molar ratios to prepare a solution; adding acetylacetone during the preparation of the solution or after the preparation; adding propylene oxide to the solution having added thereto acetylacetone; leaving the solution having added thereto propylene oxide to stand for a predetermined period of time to form a gel containing a composite of Ni, Fe, V, and Co; and leaving the gel to stand for a predetermined period of time to deflocculate the gel, to thereby form a sol containing fine particles of the layered double hydroxide represented by the formula (I). Each step in the sol-gel method, materials to be used in the respective steps, and the like are specifically described below. Each step may be performed at room temperature (about 23° C.)

First, salts of Ni, Fe, V, and Co are dissolved in an aqueous medium to prepare a solution. Examples of the salts include any appropriate salts each having an anionic moiety capable of forming $A^{n-}$ of the formula (I). Specific examples of the salts include nitrates, carbonates, sulfates, hydroxides, and halides (chlorides, iodides, bromides, and fluorides). In one embodiment, the salts are chlorides. The chlorides are inexpensive and easily available, and have high solubility in water. The salts of Ni, Fe, V, and Co may be salts of the same kind (e.g., chlorides), or may be salts of different kinds. The molar ratios of the salts may be set so that "x", "y", and "z" of the formula (I) take desired values. For example, when 12.5 mmol of $NiCl_2$, 3.12 mmol of $FeCl_3$, 1.56 mmol of $VCl_3$, and 1.56 mmol of $CoCl_2$ are used, there may be obtained a quaternary LDH represented by the formula (I) in which "x" represents about 0.17, "y" represents about 0.08, "z" represents about 0.08, and $\{1-(x+y+z)\}$ is about 0.67. The valences of Ni, Fe, V, and Co in the quaternary LDH may be different from the valences of Ni, Fe, V, and Co in the raw materials (e.g., chlorides). For example, as described above, $Co^{3+}$ may be formed in the LDH from $CoCl_2$. In addition, for example, $Ni^{2+}$ may be formed in the LDH from $NiCl_3$.

The aqueous medium typically contains water. Examples of the water include tap water, ion-exchanged water, pure water, and ultrapure water. Of those, ultrapure water is preferred. Ultrapure water contains extremely small amounts of impurities, and hence has an extremely small influence on reactions and allows an LDH with extremely small amounts of impurities to be obtained. The aqueous medium may contain a hydrophilic organic solvent. Examples of the hydrophilic organic solvent include alcohols, such as ethanol and methanol. The hydrophilic organic solvent may be preferably used in the range of from 100 parts by weight to 200 parts by weight with respect to 100 parts by weight of the water.

As required, the prepared solution is stirred. When the stirring is performed, an LDH of composition that is uniform and extremely close to design values can be obtained. A stirring time may be, for example, from 5 minutes to 30 minutes.

Next, acetylacetone is added to the solution prepared in the foregoing. Acetylacetone may be added during the preparation of the solution, or may be added after the preparation of the solution. The addition of acetylacetone can achieve spontaneous gelation to be described later and subsequent spontaneous deflocculation, and as a result, fine particles of the LDH can be produced satisfactorily (i.e., without causing flocculation and/or sedimentation). That is, the growth and stabilization of the LDH (fine particles), which are in a trade-off relationship, can both be achieved. The addition amount of acetylacetone is preferably from 0.008% to 0.036% (molar ratio), more preferably from 0.016% to 0.018% (molar ratio) with respect to the total amount of the four elements. When the addition amount of acetylacetone falls within such ranges, an LDH with extremely small amounts of impurities can be obtained.

As required, the solution having added thereto acetylacetone is stirred. A stirring time may be, for example, from 15 minutes to 60 minutes.

Next, propylene oxide is added to the solution having added thereto acetylacetone. Propylene oxide may function as a proton scavenger through the protonation of epoxy oxygen and subsequent ring opening by a nucleophilic substitution reaction with a conjugate base. Through such protonation and ring opening, the pH of the solution can be increased to promote the crystallization of the LDH (formation of plate-like fine particles) through coprecipitation. The addition amount of propylene oxide is preferably from 0.12% to 0.48% (molar ratio), more preferably from 0.23% to 0.25% (molar ratio) with respect to the total amount of the four elements.

Next, the solution having added thereto propylene oxide is left to stand for a predetermined period of time. Consequently, a gel containing a composite of Ni, Fe, V, and Co is formed. It is presumed that, substantially, the LDH as a composite has been formed by this time, and the LDH flocculates to form the gel. The period of time for which the solution is left to stand is, for example, from 2 hours to 6 hours, preferably from 2 hours to 4 hours. As required, before being left to stand (i.e., immediately after the addition of propylene oxide), the solution may be stirred for a short period of time (e.g., from 30 seconds to 2 minutes).

Finally, the gel formed in the foregoing is left to stand for a predetermined period of time. Consequently, the gel deflocculates to form a sol containing plate-like fine particles of the LDH.

In one embodiment, the sol-gel method is performed in the presence of a porous sheet. For example, the sol-gel method may be performed under a state in which the porous sheet is immersed in the aqueous medium. With such configuration, the LDH can be directly formed on the surface of the porous sheet. The porous sheet may correspond to a porous current collector of an air electrode to be described later in the section C. Accordingly, this embodiment may also be a method of producing an air electrode. In this embodiment, the production of the LDH and the binding and/or adhesion of the LDH as a catalyst layer to the porous current collector may be simultaneously performed.

Thus, the LDH may be produced. The sol-gel method may be performed in conformity with a method described in ACS Nano 2016, 10, 5550-5559. The description of the document is incorporated herein by reference.

In another embodiment, the LDH may be produced by a coprecipitation method. The coprecipitation method typically includes adding dropwise an aqueous solution of raw materials containing Ni, Fe, V, and Co to, for example, an aqueous solution of $Na_2CO_3$, and adjusting the mixture to a predetermined pH with an aqueous solution of NaOH to precipitate Ni—Fe—V—Co-based LDH particles. The precipitated LDH particles are grown by being stirred for a predetermined period of time as required. Further, the LDH particles may be crushed to provide LDH powder.

The LDH according to the embodiment of the present invention is designed to be a composite (quaternary LDH) containing the four elements of Ni, Fe, V, and Co, and thus can achieve an excellent oxygen-evolving catalytic function irrespective of its production method (be it the sol-gel method or the coprecipitation method, for example).

C. Air Electrode

C-1. Air Electrode as Single Layer

Figure 2A:
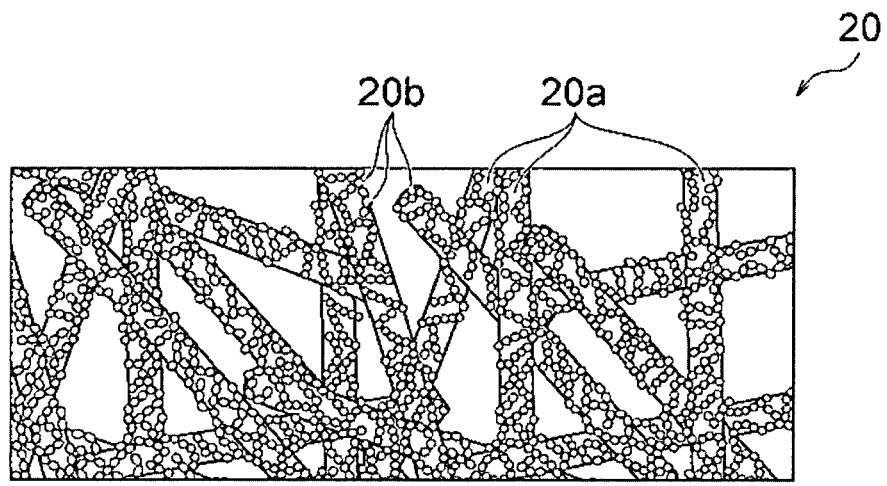
FIG. 2A is a schematic cross-sectional view for illustrating an air electrode according to one embodiment of the present invention.
Figure 2B:
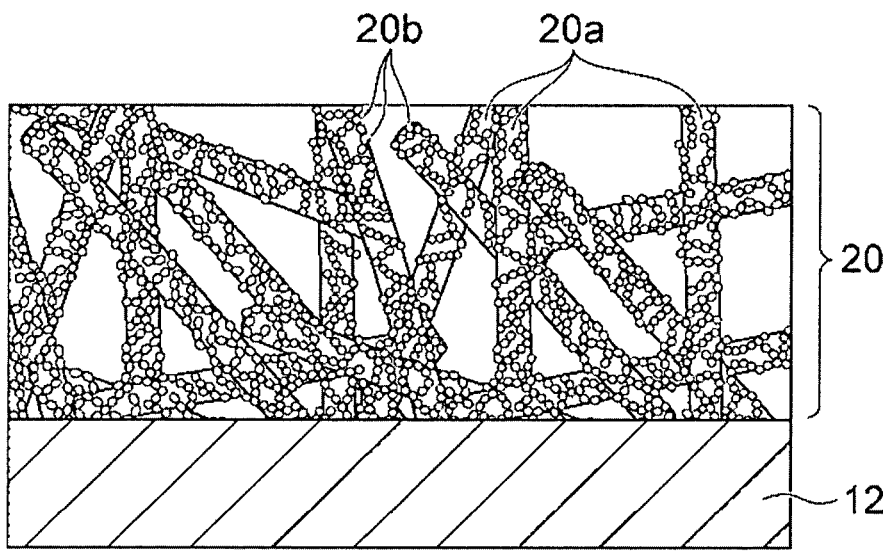
FIG. 2B is a schematic cross-sectional view for illustrating an air electrode according to another embodiment of the present invention.

FIG. 2A is a schematic cross-sectional view for illustrating an air electrode according to one embodiment of the present invention; and FIG. 2B is a schematic cross-sectional view for illustrating an air electrode according to another embodiment of the present invention. An air electrode 20 may be provided as a single sheet as illustrated in FIG. 2A, or may be provided as a laminate of the air electrode 20 and a hydroxide ion conductive dense separator 12 as illustrated in FIG. 2B. The air electrode 20 of each of the illustrated examples includes a porous current collector 20a, and a catalyst layer 20b formed of an LDH, the catalyst layer covering at least part of the porous current collector 20a. The LDH is the LDH according to the embodiment of the present invention described in the foregoing section A and section B. Any appropriate configuration applicable to an air electrode of a metal-air secondary battery may be adopted for the porous current collector 20a. The porous current collector 20a may be typically formed of an electroconductive material having gas diffusibility. Specific examples of such electroconductive material include carbon, nickel, stainless steel, titanium, and combinations thereof. Of those, carbon is preferred. As a specific configuration of the porous current collector 20a, there are given carbon paper, nickel foam, a nonwoven fabric made of stainless steel, and combinations thereof. Of those, carbon paper is preferred. A commercially available porous material may be used as the porous current collector. The thickness of the porous current collector is preferably from 0.1 mm to 1 mm, more preferably from 0.1 mm to 0.5 mm, still more preferably from 0.1 mm to 0.3 mm. When the thickness falls within such ranges, a wide reaction region, that is, a wide three-phase interface formed of an ion conductive phase (the LDH 20b), an electron conductive phase (the porous current collector 20a), and a gas phase (air) can be secured. The porosity of the porous current collector (substantially the air electrode) is preferably from 60% to 95%. When the porous current collector is carbon paper, the porosity is more preferably from 60% to 90%. When the porosity falls within such ranges, excellent gas diffusibility can be secured, and besides, a wide reaction region can be secured. In addition, pore (void) portions are increased, and hence are less liable to be clogged up with produced water. The porosity may be measured by a mercury intrusion method.

As described above, the LDH is plate-like fine particles. In the air electrode, a large number of the LDHs (plate-like fine particles) bind and/or adhere to the surface of the porous current collector to form the catalyst layer 20b. The LDHs may bind, for example, over the entirety of the porous current collector (as a result, may cover the entirety of the porous current collector), or may bind, for example, to part of the porous current collector (as a result, may cover part of the porous current collector). In one embodiment, the LDHs (plate-like fine particles) bind, for example, so that the principal surface thereof may be in a perpendicular or oblique direction with respect to the surface of the porous current collector. In addition, in one embodiment, the LDHs (plate-like fine particles) are linked to each other. With such configuration, reaction resistance can be reduced. The LDH may function not only as a catalyst (catalyst layer) but also as a hydroxide ion conductive material in the air electrode.

The LDH for forming the catalyst layer 20b may be a single (i.e., all the plate-like fine particles have the same composition) LDH, or may be a mixture of two or more kinds of LDHs having different compositions. When the catalyst layer is formed of a mixture of two or more kinds of LDHs having different compositions, the sizes of the LDHs (plate-like fine particles) of the respective compositions are typically different from each other. With such configuration, the strength for being supported on the porous current collector can be secured. Further, in one embodiment, LDHs (plate-like fine particles) having a larger size bind, for example, so that the principal surface thereof may be in a perpendicular or oblique direction with respect to the surface of the porous current collector 20a. With such configuration, the diffusion of oxygen into the porous current collector 20a can be promoted, and besides, the amount of the LDHs supported can be increased.

The air electrode may further contain an air electrode catalyst and/or a hydroxide ion conductive material other than the LDH. Specific examples of the catalyst other than the LDH include a metal oxide, metal nanoparticles, a carbon material, and combinations thereof. In addition, the air layer may further contain a material capable of adjusting a water content. In one embodiment, the LDH may function as such material. Specific examples of the material other than the LDH include a zeolite, calcium hydroxide, and a combination thereof.

C-2. Air Electrode Having Outer Layer and Inner Layer

The air electrode 20 may be configured as a single layer as described above, or may have an outer layer and an inner layer. When the air electrode has an outer layer and an inner layer, the outer layer may typically have the configuration described above as the single layer. The inner layer is typically as follows: a predetermined portion thereof in a thickness direction on the inner side of the porous current collector (hydroxide ion conductive dense separator (described later) side) is filled with a mixture containing a hydroxide ion conductive material, an electroconductive material, an air electrode catalyst (air electrode catalyst other than the quaternary LDH according to the embodiment of the present invention), and an organic polymer.

Any appropriate material having hydroxide ion conductivity may be used as the hydroxide ion conductive material. The hydroxide ion conductive material is preferably an LDH. The LDH is not limited to the LDH (quaternary LDH) according to the embodiment of the present invention described in the foregoing section A, and any appropriate LDH (e.g., a binary LDH or a ternary LDH) may be used. Specific examples of the LDH include a Mg—Al-based LDH and an LDH containing a transition metal (e.g., a Ni—Fe-based LDH or a Co—Fe-based LDH). The LDH other than the quaternary LDH according to the embodiment of the present invention is typically represented by the following formula.

$$M^{2+}{}_{1-x}M^{3+}{}_x(OH)_2A^{n-}\cdot mH_2O$$

where $M^{2+}$ represents at least one kind of divalent cation, $M^{3+}$ represents at least one kind of trivalent cation, "x" represents from 0.1 to 0.4, and $A^{n-}$ and "m" are as described for the formula (I) in the foregoing section A. Specific examples of $M^{2+}$ include $Ni^{2+}$, $Mg^{2+}$, $Ca^{2+}$, $Mn^{2+}$, $Fe^{2+}$, $Co^{2+}$, $Cu^{2+}$, and $Zn^{2+}$. Specific examples of $M^{3+}$ include $Fe^{3+}$, $Al^{3+}$, $Co^{3+}$, $Cr^{3+}$, $In^{3+}$, and $V^{3+}$. The hydroxide ion conductive material may be the same material as the air electrode catalyst.

Examples of the electroconductive material include electroconductive ceramics, a carbon material, and combinations thereof. Specific examples of the electroconductive ceramics include $LaNiO_3$ and $LaSr_3Fe_3+O_{10}$. Specific examples of the carbon material include carbon black, graphite, carbon nanotubes, graphene, reduced graphene oxide, and combinations thereof. The electroconductive material may also be the same material as the air electrode catalyst.

Examples of the air electrode catalyst include an LDH other than the quaternary LDH according to the embodiment of the present invention and other metal hydroxides, a metal oxide, metal nanoparticles, a carbon material, a nitride, and combinations thereof. Of those, an LDH, a metal oxide, metal nanoparticles, a carbon material, and combinations thereof are preferred. The LDH is as described above for the hydroxide ion conductive material. Specific examples of the metal hydroxides include Ni—Fe—OH, Ni—Co—OH, and a combination thereof. Those metal hydroxides may each further contain a third metal element. Specific examples of the metal oxide include $Co_3O_4$, $LaNiO_3$, $LaSr_3Fe_3O_{10}$, and combinations thereof. The metal nanoparticles are typically metal particles each having a particle diameter of from 2 nm to 30 nm. Specific examples of the metal nanoparticles include Pt and a Ni—Fe alloy. As described above, specific examples of the carbon material include carbon black, graphite, carbon nanotubes, graphene, reduced graphene oxide, and combinations thereof. The carbon material may further contain a metal element and/or another element, such as nitrogen, boron, phosphorus, or sulfur. With such configuration, the catalytic performance of the carbon material can be improved. An example of the nitride is TiN.

Any appropriate binder resin may be used as the organic polymer. Specific examples of the organic polymer include a butyral-based resin, a vinyl alcohol-based resin, celluloses, and a vinyl acetal-based resin. Of those, a butyral-based resin is preferred.

C-3. Laminate of Air Electrode and Hydroxide Ion Conductive Dense Separator

As described above, the air electrode may be provided as a laminate of the air electrode 20 and the hydroxide ion conductive dense separator 12 as illustrated in FIG. 2B. The air electrode may be a single layer as described in the foregoing section C-1, or may have an outer layer and an inner layer as described in the foregoing section C-2. An LDH separator may be typically used as the hydroxide ion conductive dense separator 12. The LDH separator is typically used for a metal-air secondary battery, and such metal-air secondary battery has an excellent advantage in that both of a short circuit between positive and negative electrodes due to metal dendrites and the inclusion of carbon dioxide can be prevented. In addition, there is also an advantage in that the denseness of the LDH separator can suppress the evaporation of water contained in an electrolytic solution. Meanwhile, the LDH separator blocks the permeation of the electrolytic solution into the air electrode, and hence no electrolytic solution is present in the air electrode. As a result, hydroxide ion conductivity tends to be reduced, and charge-discharge performance tends to be reduced, as compared to a metal-air secondary battery using a general separator (e.g., a porous polymer separator) that permits the permeation of the electrolytic solution into the air electrode. When the laminate of the air electrode according to the embodiment of the present invention and the LDH separator is used, such inconvenience can be eliminated while the above-mentioned excellent advantages of the LDH separator are maintained. Matters mentioned regarding the LDH separator in the following description similarly apply to a hydroxide ion conductive dense separator other than the LDH separator as long as technical consistency is not impaired. That is, in the following description, "LDH separator" may be read as "hydroxide ion conductive dense separator" as long as technical consistency is not impaired.

Any appropriate configuration may be adopted for the LDH separator. For example, a configuration described in WO 2013/073292 A1, WO 2016/076047 A1, WO 2016/067884 A1, WO 2015/146671 A1, or WO 2018/163353 A1 may be adopted for the LDH separator. The descriptions of those publications are incorporated herein by reference.

In one embodiment, the LDH separator may include a porous substrate, and a layered double hydroxide (LDH) and/or an LDH-like compound. Herein, the "LDH separator" is defined as a separator containing an LDH and/or an LDH-like compound (the LDH and the LDH-like compound may be collectively referred to as "hydroxide ion conductive layered compound"), the separator selectively allowing hydroxide ions to pass therethrough by solely utilizing the hydroxide ion conductivity of the hydroxide ion conductive layered compound. In addition, herein, the "LDH-like compound" may not be exactly called an LDH, but is a hydroxide and/or oxide of a layered crystal structure similar to the LDH, and hence may be said to be an equivalent to the LDH. However, as a broad definition, the term "LDH" may be construed as encompassing not only the LDH but also the LDH-like compound.

The LDH-like compound preferably contains Mg and Ti, and as required, Y and/or Al. When, as just described, the LDH-like compound that is a hydroxide and/or oxide of a layered crystal structure containing at least Mg and Ti is used as a hydroxide ion conductive substance in place of the related-art LDH, there can be provided a hydroxide ion conductive separator excellent in alkali resistance and capable of even more effectively suppressing a short circuit resulting from zinc dendrites. Accordingly, a preferred LDH-like compound is a hydroxide and/or oxide of a layered crystal structure containing Mg and Ti, and as required, Y and/or Al, and a more preferred LDH-like compound is a hydroxide and/or oxide of a layered crystal structure containing Mg, Ti, Y, and Al. The above-mentioned elements may be substituted with other elements or ions to such an extent that the basic characteristics of the LDH-like compound are not impaired. In one embodiment, the LDH-like compound is preferably free of Ni.

The LDH-like compound may be identified by X-ray diffraction. Specifically, when X-ray diffraction is performed on the surface of the LDH separator, a peak derived from the LDH-like compound is detected in typically the range of $5° \leq 2\theta \leq 10°$, more typically the range of $7° \leq 2\theta \leq 10°$. As described above, the LDH is a substance having an alternately stacked structure in which exchangeable anions and $H_2O$ are present as an intermediate layer between stacked hydroxide basic layers. In this regard, when the LDH is subjected to measurement by an X-ray diffraction method, a peak attributed to the crystal structure of the LDH (i.e., a (003) peak of the LDH) is originally detected at the position of $2\theta=11°$ to $12°$. On the other hand, when the LDH-like compound is subjected to measurement by the X-ray diffraction method, the peak is typically detected in the above-mentioned ranges shifted to a lower angle side with respect to the above-mentioned peak position of the LDH. In addition, the interlayer distance of the layered crystal structure may be determined by Bragg's equation through use of $2\theta$ corresponding to the peak derived from the LDH-like compound in X-ray diffraction. The thus determined interlayer distance of the layered crystal structure forming the LDH-like compound is typically from 0.883 nm to 1.8 nm, more typically from 0.883 nm to 1.3 nm.

An atomic ratio Mg/(Mg+Ti+Y+Al) in the LDH-like compound determined by energy-dispersive X-ray spectroscopy (EDS) is preferably from 0.03 to 0.25, more preferably from 0.05 to 0.2. In addition, an atomic ratio Ti/(Mg+Ti+Y+Al) in the LDH-like compound is preferably from 0.40 to 0.97, more preferably from 0.47 to 0.94. Further, an atomic ratio Y/(Mg+Ti+Y+Al) in the LDH-like compound is preferably from 0 to 0.45, more preferably from 0 to 0.37. Besides, an atomic ratio Al/(Mg+Ti+Y+Al) in the LDH-like compound is preferably from 0 to 0.05, more preferably from 0 to 0.03. When the atomic ratios fall within the above-mentioned ranges, the alkali resistance becomes even more excellent, and besides, the suppressing effect on a short circuit resulting from zinc dendrites (i.e., dendrite resistance) can be more effectively achieved. Incidentally, an LDH hitherto known regarding the LDH separator may be represented by a basic composition of the general formula: $M^{2+}_{1-x}M^{3+}_{x}(OH)_2A^{n-}_{x/n} \cdot mH_2O$ (where $M^{2+}$ represents a divalent cation, $M^{3+}$ represents a trivalent cation, $A^{n-}$ represents an n-valent anion, "n" represents an integer of 1 or more, "x" represents from 0.1 to 0.4, and "m" represents 0 or more). On the other hand, the atomic ratios in the LDH-like compound generally deviate from the general formula of the LDH. Accordingly, it may be said that the LDH-like compound generally has composition ratios (atomic ratios) different from those of the related-art LDH. EDS analysis is preferably performed with an EDS analyzer (e.g., X-act, manufactured by Oxford Instruments plc) by: 1) capturing an image at an acceleration voltage of 20 kV and a magnification of 5,000 times; 2) performing three-point analysis at intervals of about 5 μm in the point analysis mode; 3) repeating the foregoing 1) and 2) one more time; and 4) calculating an average value for a total of six points.

Figure 3:
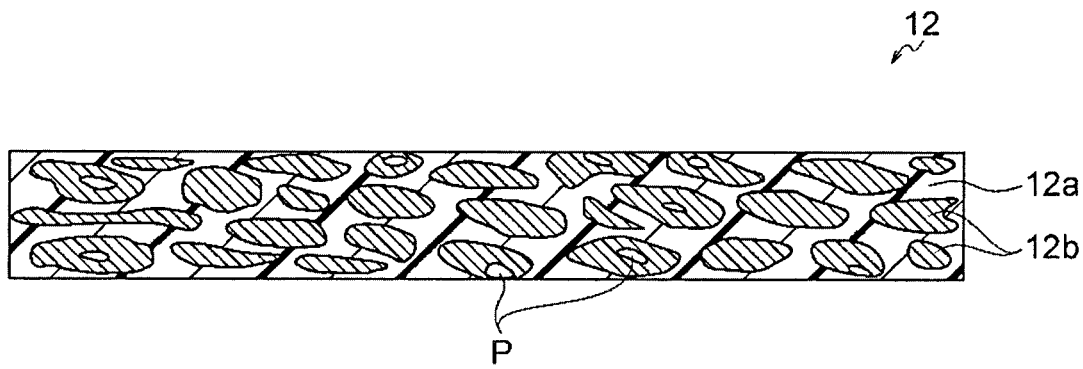
FIG. 3 is a schematic cross-sectional view for conceptually illustrating a hydroxide ion conductive dense separator that may be used in an embodiment of the present invention.

It is preferred that, as conceptually illustrated in FIG. 3, the LDH separator 12 include a porous substrate 12a made of a polymer material, and an LDH 12b that clogs up pores P of the porous substrate. Substantially, the pores of the porous substrate 12a do not need to be completely clogged up, and a small number of residual pores P may be present. By including the polymer porous substrate, the LDH separator can flex and is hardly broken even when pressurized, and hence can be accommodated in a battery container and pressurized together with other battery elements (such as a negative electrode) in a direction in which the battery elements are brought into close contact with each other. Such pressurization becomes particularly advantageous when a plurality of air electrode/separator laminates are incorporated in a battery container alternately with a plurality of metal negative electrodes to form a laminated battery. Similarly, the pressurization is also advantageous when a plurality of laminated batteries are accommodated in one module container to form a battery module. For example, when a metal-air secondary battery is pressurized, a gap allowing the growth of metal dendrites between the negative electrode and the LDH separator is minimized (preferably the gap is eliminated), and thus more effective prevention of metal dendrite growth can be expected. Further, when the polymer porous substrate is highly densified by clogging up the pores thereof with the LDH, there can be provided an LDH separator that can even more effectively suppress a short circuit resulting from metal dendrites. In FIG. 3, the regions of the LDH 12b are illustrated as if discontinuous between the upper surface and lower surface of the LDH separator 12, but this is because of being two-dimensionally illustrated as a cross-section. In the actual LDH separator, the regions of the LDH 12b are continuous between the upper surface and the lower surface, and thus the hydroxide ion conductivity of the LDH separator 12 is secured.

As described above, the LDH separator 12 includes the polymer porous substrate 12a. The polymer porous substrate has advantages such as 1) having flexibility (accordingly, being hardly broken even when reduced in thickness), 2) easily achieving a high porosity, 3) easily achieving a high conductivity (because it is possible to reduce the thickness while increasing the porosity), and 4) being easy to produce and handle. In addition, through good use of the advantage resulting from the flexibility of 1) above, there is also an advantage in that 5) the LDH separator including the polymer porous substrate can be easily bent or sealed and bonded. Specific examples of the polymer material include polystyrene, polyethersulfone, a polyolefin (e.g., polyethylene or polypropylene), an epoxy resin, polyphenylene sulfide, a fluororesin (e.g., a tetrafluororesin: PTFE), cellulose, nylon, and combinations thereof. Of those, polystyrene, polyethersulfone, a polyolefin (e.g., polyethylene or polypropylene), an epoxy resin, polyphenylene sulfide, a fluororesin (e.g., a tetrafluororesin: PTFE), nylon, and combinations thereof are preferred from the viewpoint of being a thermoplastic resin suitable for thermal pressing. Those materials each have alkali resistance as resistance to the electrolytic solution of a battery. The polymer material is more preferably a polyolefin, such as polypropylene or polyethylene, because of excellent hot-water resistance, acid resistance, and alkali resistance, and low cost, and is particularly preferably polypropylene or polyethylene. When the porous substrate is formed of a polymer material, it is particularly preferred that the LDH be incorporated over the entire thickness direction of the porous substrate (for example, most or nearly all pores inside the porous substrate be filled with the LDH). A commercially available polymeric microporous membrane may be used as such polymer porous substrate. As described above, in the LDH separator 12, the hardness, brittleness, and the like of the LDH, which is a ceramic material, are offset or reduced by the flexibility, toughness, and the like of the polymer porous substrate, and hence such excellent pressurization resistance and processability/assemblability as described above can be achieved while excellent characteristics resulting from the LDH are maintained.

Any appropriate LDH may be used as the LDH 12b as long as the pores of the polymer porous substrate can be clogged up to densify the LDH separator. That is, as the LDH, the quaternary LDH according to the embodiment of the present invention may be used, or any appropriate LDH other than the embodiment of the present invention may be used. The quaternary LDH is as described in the foregoing section A. As the other LDH, for example, the LDH described in the foregoing section C-2 may be used, or the LDH described in any of the above-mentioned international publications incorporated herein may be used.

The LDH separator 12 preferably has as small a number of the residual pores P (pores that are not clogged up with the LDH) as possible. The average porosity of the LDH separator resulting from the residual pores P thereof is, for example, 0.03% or more and less than 1.0%, preferably from 0.05% to 0.95%, more preferably from 0.05% to 0.9%, still more preferably from 0.05% to 0.8%, particularly preferably from 0.05% to 0.5%. When the average porosity falls within such ranges, the pores of the porous substrate 12a are sufficiently clogged up with the LDH 12b, and hence an extremely high degree of denseness can be achieved, with the result that a short circuit resulting from metal dendrites can be even more effectively suppressed. In addition, a significantly high ion conductivity can be achieved, and the LDH separator 12 can exhibit a sufficient function as a hydroxide ion conductive dense separator. The average porosity may be obtained by: a) cross-sectionally polishing the LDH separator with a cross-section polisher (CP); b) capturing cross-sectional images of a functional layer in two fields of vision with a field emission scanning electron microscope (FE-SEM) at a magnification of 50,000 times; and c) calculating the porosity of each of the two fields of vision through use of image inspection software (e.g., HDevelop, manufactured by MVTec Software) on the basis of image data on the captured cross-sectional images, followed by determination of the average value of the resultant porosities.

The LDH separator 12 typically has gas impermeability and/or water impermeability. In other words, the LDH separator 12 is so densified as to have gas impermeability and/or water impermeability. Herein, the expression "have gas impermeability" means that, when a helium gas is brought into contact with one surface side of a measurement object in water at a differential pressure of 0.5 atm, the generation of bubbles resulting from the helium gas is not observed from the other surface side. In addition, herein, the expression "have water impermeability" means that water brought into contact with one surface side of a measurement object does not permeate therethrough to the other surface side. With this configuration, the LDH separator 12 selectively allows only hydroxide ions to pass therethrough due to its hydroxide ion conductivity, and can exhibit a function as a separator for a battery. Further, the configuration is extremely effective for preventing a short circuit between positive and negative electrodes by physically blocking penetration through the separator by metal dendrites produced at the time of charge. The LDH separator has hydroxide ion conductivity, and hence enables efficient movement of required hydroxide ions between a positive electrode plate and a negative electrode plate, with the result that charge-discharge reactions in the positive electrode plate and the negative electrode plate can be achieved.

The LDH separator 12 has a He permeability per unit area of preferably 3.0 cm/minatm or less, more preferably 2.0 cm/minatm or less, still more preferably 1.0 cm/minatm or less. When the He permeability falls within such ranges, the permeation of metal ions in an electrolytic solution can be extremely effectively suppressed. It is conceived in principle that, as a result, the separator can effectively suppress the growth of metal dendrites when used for a metal-air secondary battery. The He permeability is measured through: a step of supplying a He gas to one surface of the separator to allow the He gas to permeate through the separator; and a step of calculating the He permeability to evaluate the denseness of the hydroxide ion conductive dense separator. The He permeability is calculated by the expression $F/(P \times S)$ through use of a permeation amount F of the He gas per unit time, a differential pressure P applied to the separator at the time of He gas permeation, and an area S of the membrane through which the He gas permeates. When gas permeability is evaluated using the He gas as just described, the presence or absence of denseness at an extremely high level can be evaluated, and as a result, such a high degree of denseness that a substance other than hydroxide ions (in particular, metal ions that cause metal dendrite growth) is prevented to the extent possible from permeating (allowed to permeate only in an extremely small amount) can be effectively evaluated. This is because the He gas has the smallest constituent unit among atoms or molecules that can constitute gases, and also has extremely low reactivity. That is, He does not form a molecule, and single He atoms constitute the He gas. Meanwhile, a hydrogen gas is constituted of $H_2$ molecules, and hence a single He atom is smaller as a gas constituent unit. In the first place, the $H_2$ gas is a flammable gas, and hence is dangerous. When the He gas permeability defined by the above-mentioned expression is adopted as an indicator as described above, objective evaluation for denseness can be simply performed irrespective of various sample sizes and differences in measurement conditions. Thus, whether or not the separator has sufficiently high denseness suited as a separator for a metal-air secondary battery can be evaluated simply, safely, and effectively.

The thickness of the LDH separator 12 may be, for example, from 5 μm to 200 μm.

D. Metal-Air Secondary Battery

A metal-air secondary battery according to an embodiment of the present invention includes: the air electrode described in the foregoing section C-1 or section C-2; a hydroxide ion conductive dense separator; an electrolytic solution; and a metal negative electrode. The hydroxide ion conductive dense separator in this embodiment is described in the foregoing section C-3. A metal-air secondary battery according to another embodiment of the present invention includes: the air electrode described in the foregoing section C-3 (laminate of the air electrode and the hydroxide ion conductive dense separator); an electrolytic solution; and a metal negative electrode. In each of the embodiments, the electrolytic solution is separated from the air electrode by the hydroxide ion conductive dense separator. Through combined use of the air electrode described in the foregoing section C-1 to section C-3 and the hydroxide ion conductive dense separator, the metal-air secondary battery can simultaneously satisfy the advantages of: (i) being able to prevent both of a short circuit between positive and negative electrodes due to metal dendrites and the inclusion of carbon dioxide; (ii) being able to suppress the evaporation of water contained in the electrolytic solution; and (iii) having excellent charge-discharge performance. In one embodiment, the metal-air secondary battery is a zinc-air secondary battery in which the metal of the negative electrode is zinc. Configurations commonly used in the art may be adopted for the metal-air secondary battery, and hence detailed description of its configuration is omitted.

EXAMPLES

Now, the present invention is specifically described by way of Examples. However, the present invention is not limited to these Examples.

Example 1

An aqueous medium containing 45 wt % of ultrapure water and wt % of ethanol was prepared. 12.5 mmol of $NiCl_2$ ($[1-(x+y+z)]=0.67$), 2.08 mmol of $FeCl_3$ (x=0.11), 2.08 mmol of $VCl_3$ (y=0.11), and 2.08 mmol of $CoCl_2$ (x=0.11) were dissolved in the aqueous medium, and the whole was stirred for 10 minutes to prepare a solution. Acetylacetone was added to the solution. The addition amount of acetylacetone was 0.017% (molar ratio) with respect to the total amount of the Ni, Fe, V, and Co elements. The solution was stirred for 30 minutes, and then propylene oxide was added. The addition amount of propylene oxide was 0.24% (molar ratio) with respect to the total amount of the Ni, Fe, V, and Co elements. The solution was stirred for 1 minute, and then left to stand still for 3 hours. As a result, the solution gelled spontaneously. The resultant gel was further left to stand still for 24 hours, and as a result, became a sol spontaneously. The series of operations were performed at room temperature. Thus, a Ni—Fe—V—Co-based LDH was obtained. The catalytic activity of the obtained LDH was evaluated as described below.

With regard to the catalytic activity of the obtained LDH, performance as an OER-side catalyst was evaluated using a Rotating Ring Disk Electrodes (RRDE) measurement method. A measurement apparatus used was a product manufactured under the product name "Rotating Ring Disk Electrode Apparatus" by BAS Inc. A platinum ring-GC disk electrode manufactured by BAS Inc. was used as an electrode. 0.1 M KOH was used as an electrolytic solution. Meanwhile, 4 mg of the LDH obtained in the foregoing, 1,500 μL of ethanol, and 500 μL of an ion exchange material (manufactured by Sigma-Aldrich Corporation, product name: "Nafion (trademark)") were ultrasonically mixed for 1 hour to provide a liquid for measurement. 6 μL of the liquid for measurement was cast onto the disk electrode, and hydrodynamic voltammetry measurement was performed at a number of rotations of 1,600 rpm and a chiller temperature of 25° C. under an oxygen atmosphere to determine an onset potential and a potential at a current density of 2 mA/cm² from a relationship between potential with respect to a hydrogen electrode and current density. The onset potential was defined as a potential at the time when AA/AV became 3. The results are shown in Table 1.

Examples 2 to 21 and Comparative Examples 1 to 8

Figure 4:
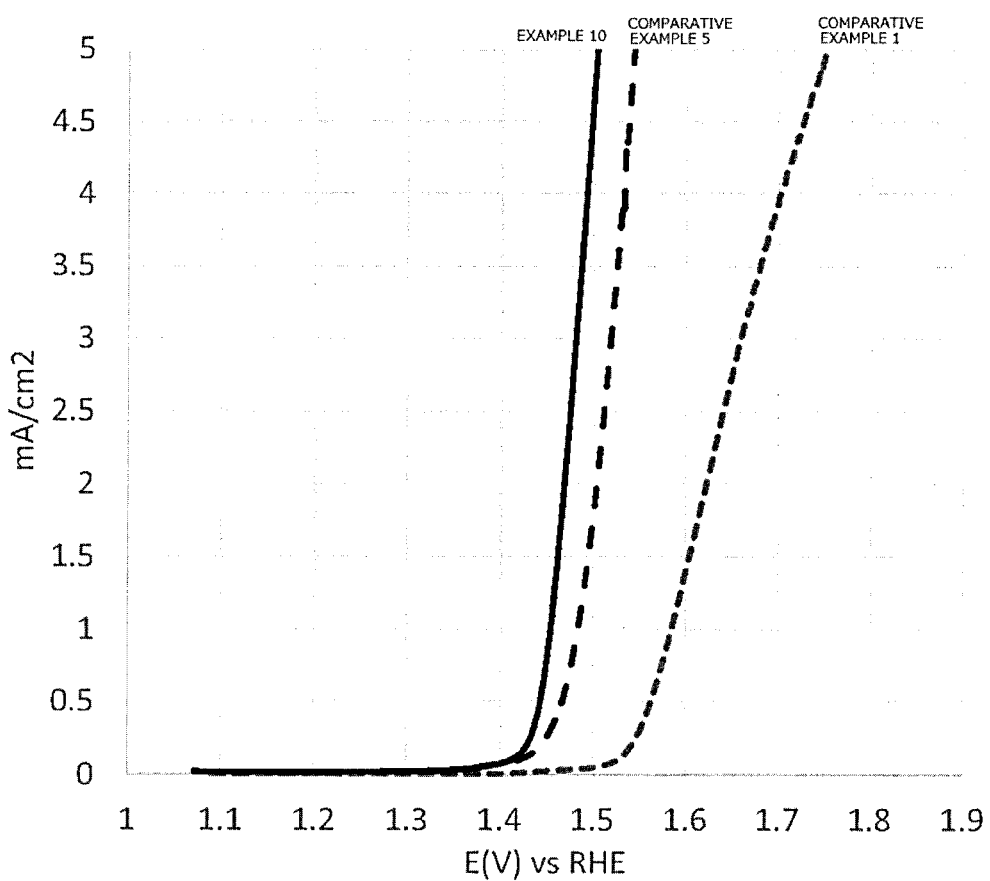
FIG. 4 is a graph comparatively showing relationships between potential with respect to a hydrogen electrode and current density for Example 10, Comparative Example 1, and Comparative Example 5.
Figure 5:
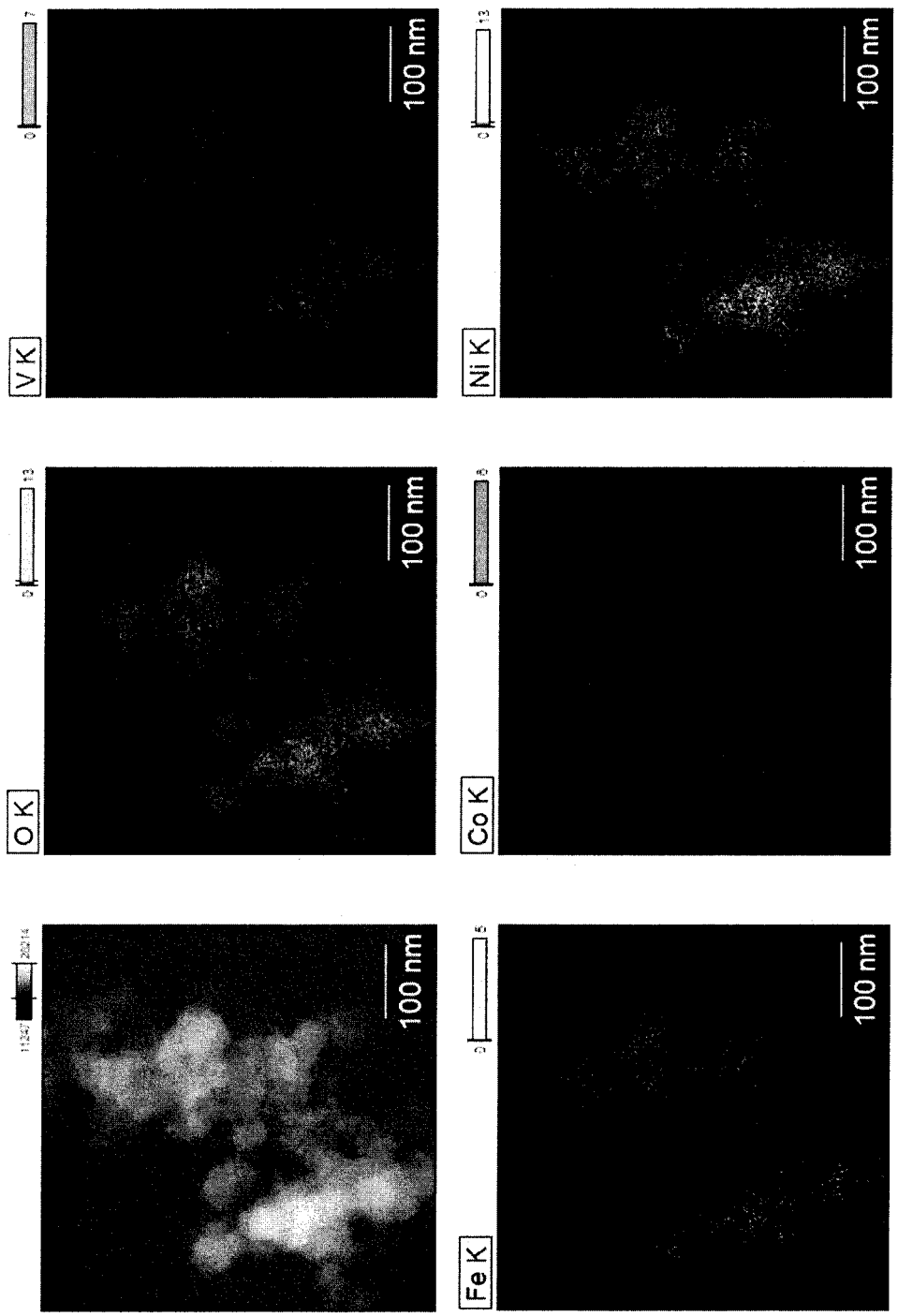
FIG. 5 includes transmission electron microscopic images showing the elemental mapping of an LDH of Example 4.
Figure 6:
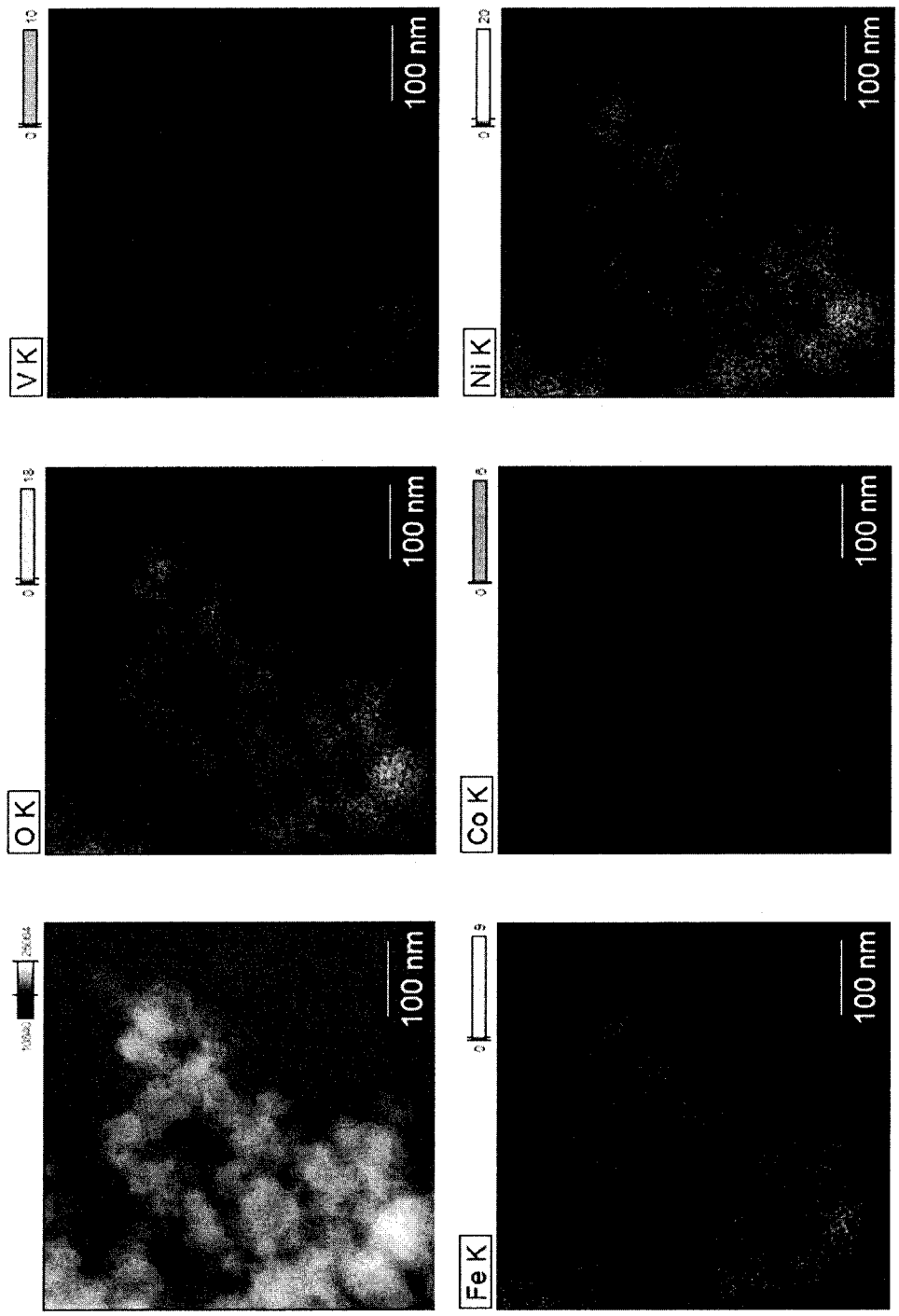
FIG. 6 includes transmission electron microscopic images showing the elemental mapping of an LDH of Example 10.

LDHs were produced in the same manner as in Example 1 except that composition ratios shown in Table 1 were adopted. The resultant LDHs were subjected to the same evaluation as in Example 1. The results are shown in Table 1. Further, a graph for comparing relationships between potential with respect to a hydrogen electrode and current density for Example 10, Comparative Example 1, and Comparative Example 5 is shown in FIG. 4. In addition, for each of the LDHs of Examples 4 and 10, elemental mapping was performed by energy-dispersive X-ray spectroscopy using a transmission electron microscope (TEM) (TEM-EDX). The results of Example 4 are shown in FIG. 5, and the results of Example 10 are shown in FIG. 6.

Example 22

18.0 mmol of $Ni(NO_3)_2 \cdot 6H_2O$ ($[1-(x+y+z)]=0.58$), 6.20 mmol of $Fe(NO_3)_3 \cdot 9H_2O$ ($x=0.20$), 6.20 mmol of $VCl_3$ ($x=0.20$), and 0.60 mmol of $Co(NO_3)_2 \cdot 6H_2O$ ($x=0.02$) were dissolved in ion-exchanged water, and the whole was stirred for 10 minutes to provide 100 ml of an aqueous solution of raw materials. 100 ml of the aqueous solution of raw materials was added dropwise to 100 ml of a 0.1 M aqueous solution of $Na_2CO_3$ under stirring. At this time, a 2 M aqueous solution of NaOH was added dropwise to the aqueous solution of raw materials as needed so that the pH of the aqueous solution of raw materials was always 10. The thus obtained reaction solution was stirred at room temperature for 24 hours to grow Ni—Fe—V—Co-based LDH particles. The thus obtained LDH particles were separated by suction filtration, and subjected to washing with water and washing with ethanol to remove nitrates and sodium. The thus washed particles were dried at room temperature, and then crushed in a mortar to provide LDH powder. The resultant LDH was subjected to the same evaluation as in Example 1. The results are shown in Table 1.

TABLE 1

| | Ni | | | Fe | | | V | | | Co (Al only in Comparative Example 8) | | | Potential | |
|---|---|---|---|---|---|---|---|---|---|---|---|---|---|---|
| | Raw material | Use amount (mmol) | 1-a | Raw material | Use amount (mmol) | x | Raw material | Use amount (mmol) | y | Raw material | Use amount (mmol) | z | Onset potential (V) | at 2 mA/cm² (V) |
| Example 1 | $NiCl_2$ | 12.50 | 0.67 | $FeCl_3$ | 2.08 | 0.11 | $VCl_3$ | 2.08 | 0.11 | $CoCl_2$ | 2.08 | 0.11 | 1.449 | 1.583 |
| Example 2 | $NiCl_2$ | 12.50 | 0.67 | $FeCl_3$ | 3.12 | 0.17 | $VCl_3$ | 1.56 | 0.08 | $CoCl_2$ | 1.56 | 0.08 | 1.460 | 1.543 |
| Example 3 | $NiCl_2$ | 12.50 | 0.67 | $FeCl_3$ | 1.25 | 0.07 | $VCl_3$ | 2.50 | 0.13 | $CoCl_2$ | 2.50 | 0.13 | 1.451 | 1.525 |
| Example 4 | $NiCl_2$ | 12.50 | 0.67 | $FeCl_3$ | 1.56 | 0.08 | $VCl_3$ | 3.12 | 0.17 | $CoCl_2$ | 1.56 | 0.08 | 1.458 | 1.488 |
| Example 5 | $NiCl_2$ | 12.50 | 0.67 | $FeCl_3$ | 2.50 | 0.13 | $VCl_3$ | 1.25 | 0.07 | $CoCl_2$ | 2.50 | 0.13 | 1.391 | 1.519 |
| Example 6 | $NiCl_2$ | 12.50 | 0.67 | $FeCl_3$ | 1.56 | 0.08 | $VCl_3$ | 1.56 | 0.08 | $CoCl_2$ | 3.12 | 0.17 | 1.400 | 1.564 |
| Example 7 | $NiCl_2$ | 12.50 | 0.67 | $FeCl_3$ | 2.50 | 0.13 | $VCl_3$ | 2.50 | 0.13 | $CoCl_2$ | 1.25 | 0.07 | 1.416 | 1.493 |
| Example 8 | $NiCl_2$ | 10.00 | 0.61 | $FeCl_3$ | 1.56 | 0.10 | $VCl_3$ | 3.12 | 0.19 | $CoCl_2$ | 1.56 | 0.10 | 1.458 | 1.488 |
| Example 9 | $NiCl_2$ | 7.50 | 0.55 | $FeCl_3$ | 1.56 | 0.11 | $VCl_3$ | 3.12 | 0.23 | $CoCl_2$ | 1.56 | 0.11 | 1.458 | 1.588 |
| Example 10 | $NiCl_2$ | 12.50 | 0.67 | $FeCl_3$ | 2.97 | 0.16 | $VCl_3$ | 2.97 | 0.16 | $CoCl_2$ | 0.31 | 0.01 | 1.416 | 1.469 |
| Example 11 | $NiCl_2$ | 12.50 | 0.67 | $FeCl_3$ | 2.19 | 0.12 | $VCl_3$ | 2.50 | 0.13 | $CoCl_2$ | 1.56 | 0.08 | 1.413 | 1.522 |
| Example 12 | $NiCl_2$ | 12.50 | 0.67 | $FeCl_3$ | 0.94 | 0.05 | $VCl_3$ | 3.75 | 0.20 | $CoCl_2$ | 1.56 | 0.08 | 1.383 | 1.495 |
| Example 13 | $NiCl_2$ | 12.50 | 0.67 | $FeCl_3$ | 0.31 | 0.02 | $VCl_3$ | 4.38 | 0.23 | $CoCl_2$ | 1.56 | 0.08 | 1.350 | 1.503 |
| Example 14 | $NiCl_2$ | 13.50 | 0.68 | $FeCl_3$ | 1.88 | 0.10 | $VCl_3$ | 3.75 | 0.19 | $CoCl_3$ | 0.63 | 0.03 | 1.459 | 1.530 |
| Example 15 | $NiCl_2$ | 12.50 | 0.67 | $FeCl_3$ | 1.88 | 0.10 | $VCl_3$ | 3.75 | 0.20 | $CoCl_3$ | 0.63 | 0.03 | 1.426 | 1.489 |
| Example 16 | $NiCl_2$ | 15.00 | 0.71 | $FeCl_3$ | 1.56 | 0.07 | $VCl_3$ | 3.12 | 0.15 | $CoCl_2$ | 1.56 | 0.07 | 1.396 | 1.763 |
| Example 17 | $NiCl_2$ | 12.50 | 0.67 | $FeCl_3$ | 2.03 | 0.11 | $VCl_3$ | 3.91 | 0.21 | $CoCl_2$ | 0.31 | 0.01 | 1.413 | 1.480 |
| Example 18 | $NiCl_2$ | 12.50 | 0.67 | $FeCl_3$ | 0.63 | 0.03 | $VCl_3$ | 5.00 | 0.27 | $CoCl_2$ | 0.63 | 0.03 | 1.413 | 1.531 |
| Example 19 | $NiCl_2$ | 12.50 | 0.67 | $FeCl_3$ | 0.78 | 0.04 | $VCl_3$ | 5.16 | 0.28 | $CoCl_2$ | 0.31 | 0.01 | 1.446 | 1.505 |
| Example 20 | $NiCl_2$ | 12.50 | 0.67 | $FeCl_3$ | 0.94 | 0.05 | $VCl_3$ | 4.69 | 0.25 | $CoCl_2$ | 0.63 | 0.03 | 1.403 | 1.515 |
| Example 21 | $NiCl_2$ | 8.13 | 0.56 | $FeCl_3$ | 2.97 | 0.21 | $VCl_3$ | 2.97 | 0.21 | $CoCl_2$ | 0.31 | 0.02 | 1.446 | 1.479 |
| Example 22 | $Ni(NO_3)_2$ | 18.00 | 0.58 | $Fe(NO_3)_3$ | 6.20 | 0.20 | $VCl_3$ | 6.20 | 0.20 | $Co(NO_3)_2$ | 0.60 | 0.02 | 1.435 | 1.456 |
| Comparative Example 1 | $NiCl_2$ | 12.50 | 0.67 | $FeCl_3$ | 6.30 | 0.33 | — | — | — | — | — | — | 1.540 | 1.620 |
| Comparative Example 2 | $NiCl_2$ | 12.50 | 0.67 | — | — | — | $VCl_3$ | 6.30 | 0.33 | — | — | — | 1.466 | 1.559 |
| Comparative Example 3 | $NiCl_2$ | 12.50 | 0.67 | — | — | — | — | — | — | $CoCl_2$ | 6.30 | 0.33 | Unmeasurable | Unmeasurable |
| Comparative Example 4 | $NiCl_2$ | 12.50 | 0.67 | $FeCl_3$ | 3.75 | 0.20 | $VCl_3$ | 2.50 | 0.13 | — | — | — | 1.465 | 1.601 |
| Comparative Example 5 | $NiCl_2$ | 12.50 | 0.67 | $FeCl_3$ | 1.25 | 0.06 | $VCl_3$ | 5.00 | 0.27 | — | — | — | 1.452 | 1.503 |
| Comparative Example 6 | $NiCl_2$ | 12.50 | 0.67 | $FeCl_3$ | 5.00 | 0.27 | — | — | — | $CoCl_2$ | 1.25 | 0.06 | 1.478 | 1.592 |
| Comparative Example 7 | $NiCl_2$ | 12.50 | 0.67 | — | — | — | $VCl_3$ | 2.50 | 0.13 | $CoCl_2$ | 3.75 | 0.20 | 1.538 | 1.697 |
| Comparative Example 8 | $NiCl_2$ | 12.50 | 0.67 | $FeCl_3$ | 5.00 | 0.27 | — | — | — | $AlCl_3$ | 1.25 | 0.06 | 1.513 | 1.621 |

"Unmeasurable" means that no LDH was formed.
"a" represents (x + y + z).

As apparent from Table 1 and FIG. 4, it is found that the quaternary LDHs of Examples of the present invention each have a small onset potential and a small potential at a current density of 2 mA/cm$^2$, thus being excellent in catalytic activity, as compared to the binary LDHs and the ternary LDHs of Comparative Examples. Further, as apparent from FIG. 5 and FIG. 6, it is found that, in the LDHs of Examples of the present invention, Ni, Fe, V, and Co have substantially identical mapping shapes (that is, these elements are present at nearly identical sites), and hence these elements are composited instead of being merely mixed.

INDUSTRIAL APPLICABILITY

The layered double hydroxide of the present invention can be suitably used as a catalyst for an air electrode of a metal-air secondary battery.

What is claimed is:

1. A layered double hydroxide, which is represented by the formula (I):

$$\text{Ni}^{2+}{}_{1-(x+y+z)}\text{Fe}^{3+}{}_{x}\text{V}^{3+}{}_{y}\text{Co}^{3+}{}_{z}(\text{OH})_2\text{An}^{-}{}_{(x+y+z)/n}\cdot m\text{H}_2\text{O} \quad (I)$$

wherein, in the formula (I), (x+y+z) is from 0.2 to 0.5, "x" represents more than 0 and 0.3 or less, "y" represents from 0.04 to 0.49, and "z" represents more than 0 and 0.2 or less, "An-" represents any appropriate anion, "n" represents an integer of 1 or more, and "m" represents a real number of more than 0.

2. A method of producing the layered double hydroxide of claim 1, the method comprising:
dissolving salts of Ni, Fe, V, and Co in an aqueous medium at respective predetermined molar ratios to prepare a solution;
adding acetylacetone during the preparation of the solution or after the preparation;
adding propylene oxide to the solution having added thereto acetylacetone;
leaving the solution having added thereto propylene oxide to stand for a predetermined period of time to form a gel containing a composite of Ni, Fe, V, and Co; and
leaving the gel to stand for a predetermined period of time to deflocculate the gel, to thereby form a sol containing fine particles of the layered double hydroxide represented by the formula (I).

3. The method of producing the layered double hydroxide according to claim 2, wherein the salts are chlorides.

4. An air electrode, comprising:
a porous current collector; and
a catalyst layer formed of the layered double hydroxide of claim 1, the catalyst layer covering at least part of the porous current collector.

5. A metal-air secondary battery, comprising:
the air electrode of claim 4;
a hydroxide ion conductive dense separator;
an electrolytic solution; and
a metal negative electrode,
wherein the electrolytic solution is separated from the air electrode by the hydroxide ion conductive dense separator.

* * * * *

UNITED STATES PATENT AND TRADEMARK OFFICE
CERTIFICATE OF CORRECTION

PATENT NO. : 11,936,069 B2
APPLICATION NO. : 17/812236
DATED : March 19, 2024
INVENTOR(S) : Ozora Kano et al.

It is certified that error appears in the above-identified patent and that said Letters Patent is hereby corrected as shown below:

In the Claims

Column 17, Claim 1, Lines 21-31:
Please change:
"A layered double hydroxide, which is represented by the formula (I):

Ni2+1-(x+y+z)Fe3+xV3+yCo3+z(OH)2An-(x+y+z)/n·mH2O wherein, in the formula (I), (x+y+z) is from 0.2 to 0.5, "x" represents more than 0 and 0.3 or less, "y" represents from 0.04 to 0.49, and "z" represents more than 0 and 0.2 or less, "An-" represents any appropriate anion, "n" represents an integer of 1 or more, and "m" represents a real number of more than 0."
To:
-- A layered double hydroxide, which is represented by the formula (I):

$Ni^{2+}_{1-(x+y+z)}Fe^{3+}_{x}V^{3+}_{y}Co^{3+}_{z}(OH)_2 A^{n-}_{(x+y+z)/n} \cdot mH_2O \cdots (I)$, wherein, in the formula (I), (x+y+z) is from 0.2 to 0.5, "x" represents more than 0 and 0.3 or less, "y" represents from 0.04 to 0.49, and "z" represents more than 0 and 0.2 or less, "$A^{n-}$" represents any appropriate anion, "n" represents an integer of 1 or more, and "m" represents a real number of more than 0. --

Signed and Sealed this
Twenty-first Day of May, 2024

*Katherine Kelly Vidal*
Katherine Kelly Vidal
*Director of the United States Patent and Trademark Office*